(12) United States Patent
Nothofer

(10) Patent No.: US 6,487,346 B2
(45) Date of Patent: Nov. 26, 2002

(54) OPTICAL CABLE

(75) Inventor: Klaus Nothofer, Erkrath (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/799,128

(22) Filed: Mar. 6, 2001

(65) Prior Publication Data

US 2001/0021296 A1 Sep. 13, 2001

(30) Foreign Application Priority Data

Mar. 7, 2000 (DE) ............................... 100 10 996

(51) Int. Cl.[7] ................................................ G02B 6/44
(52) U.S. Cl. ....................................... 385/109; 385/106
(58) Field of Search ................................ 385/109, 117, 385/113, 103, 106

(56) References Cited

U.S. PATENT DOCUMENTS

| | | | | |
|---|---|---|---|---|
| 5,247,599 A | * | 9/1993 | Vyas et al. .................. | 385/109 |
| 5,343,549 A | * | 8/1994 | Nave et al. .................. | 385/103 |
| 5,390,273 A | * | 2/1995 | Rahman et al. .............. | 385/112 |
| 5,684,904 A | * | 11/1997 | Bringuier et al. ........... | 385/106 |
| 5,703,984 A | * | 12/1997 | Carratt et al. ............... | 385/102 |
| 5,751,879 A | * | 5/1998 | Graham et al. .............. | 174/107 |
| 6,035,087 A | * | 3/2000 | Bonicel et al. .............. | 385/109 |
| 6,236,789 B1 | * | 5/2001 | Fitz ............................. | 385/100 |

OTHER PUBLICATIONS

International Wire and Cable Symposium Proceedings 1999, "A New Type of High Fiber Count, Low Dimension Optical Cable with Simplified Installation Characteristics", by Stefan Pastuszka,, et al., pp. 106–111.

* cited by examiner

Primary Examiner—Tulsidas Patel
(74) Attorney, Agent, or Firm—Sughrue Mion, PLLC

(57) ABSTRACT

Described is an optical cable or cable element with a plurality of optical waveguide elements which are stranded together and each consist of several optical waveguides, collected into a bundle, and of a plastic covering surrounding the bundle with a maximum free space of 0.1 mm, and of a non-compressible filling compound filling the intermediate spaces between the optical waveguides, and with a layer of longitudinally aligned glass or plastic fibers surrounding the optical waveguide elements and with an extruded outer jacket of a polymer, the outer jacket compressing the layer radially.

9 Claims, 3 Drawing Sheets

OPTICAL CABLE

BACKGROUND OF THE INVENTION

The invention concerns an optical cable or cable element.

Known in the art is an optical cable consisting of a plurality of individual optical waveguides. The optical waveguides are collected into individual optical waveguide bundles, each optical waveguide bundle being surrounded by a plastic covering. Within the plastic covering, in addition to the optical waveguides, is a compound of incompressible material, e.g. petroleum jelly. Several such optical waveguide bundles are stranded together and the stranded assemblage is surrounded by a plastic jacket. Embedded opposite one another within the wall of the plastic jacket are two tensile-stress-and compression-resistant elements (International Wire & Cable Symposium Proceedings 1999, Page 106).

This known cable is distinguished by a high fibre density. Thus, the cable has up to 144 fibers, with a cable outer diameter of 13.5 mm. The two tensile-stress/compression elements present in the cable jacket give the cable a high load capability in respect of tensile stress and compression. A further advantage is that the fibers are easily accessible.

The object of the present invention is to provide for a cable which has the same advantages as the known cable but which has a smaller outer diameter with the same number of fibers or an equal outer diameter with a higher number of fibers.

SUMMARY OF THE INVENTION

This object is achieved by the optical cable or cable element with a plurality of optical waveguide elements which are stranded together and each consist of several optical waveguides, collected into a bundle, and of a plastic covering surrounding the bundle with a maximum free space of 0.1 mm, and of a non-compressible filling compound filling the intermediate spaces between the optical waveguides, and with a layer of longitudinally aligned glass or plastic fibers surrounding the optical waveguide elements and with an extruded outer jacket of a polymer, the outer jacket compressing the layer radially.

The essential advantage of the cable according to the invention compared with the known cable lies in the fact that the tensile-stress/compression elements in the wall of the jacket can be omitted. The bending behaviour of the cable is improved substantially as a result. The tensile-stress/compression stability is provided by the layer compressed by the outer jacket. In addition, the compressed layer protects the optical waveguides from transverse forces, which has a positive effect on the transmission characteristics. By comparison with the known cable, a cable diameter reduction of up to 25% is achieved.

BRIEF DESCRIPTION OF THE DRAWINGS

The invention is described more fully with reference to the embodiment examples depicted schematically in FIGS. 1 to 3, wherein.

DETAILED DESCRIPTION OF THE INVENTION

Figure 1:
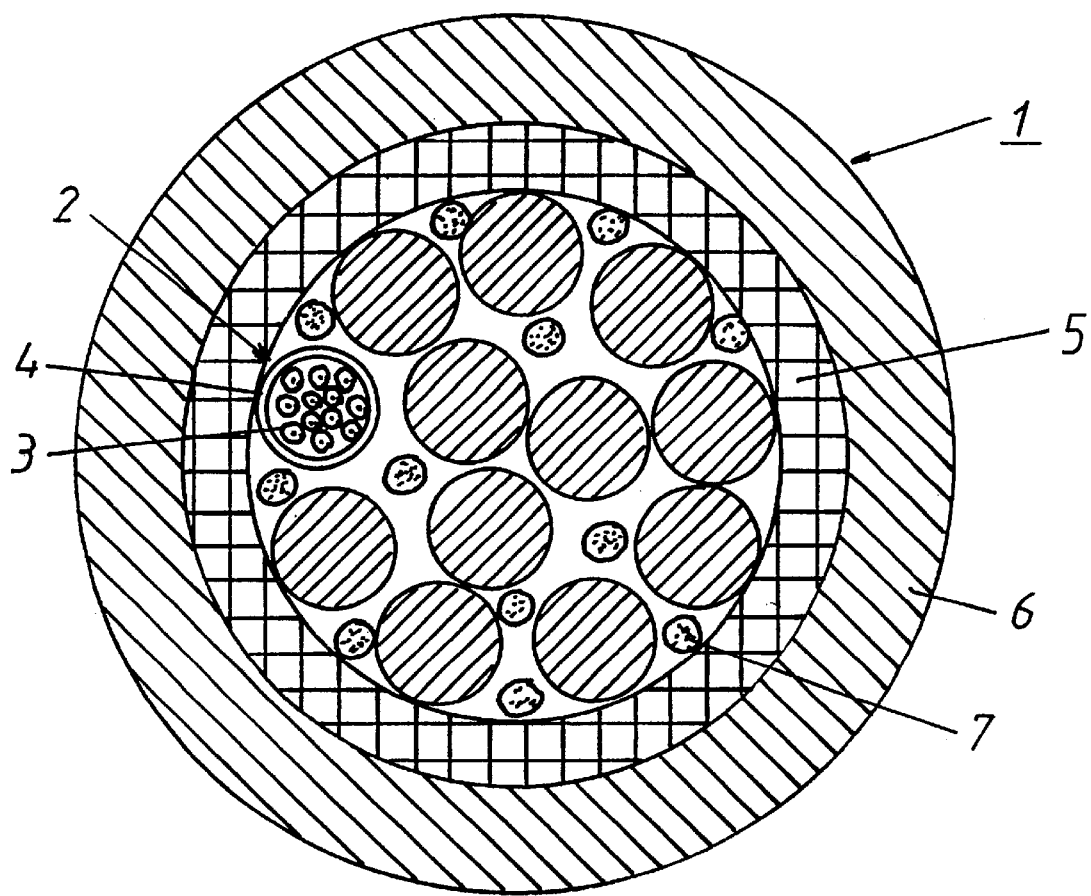
FIG. 1 shows a cable with 144 fibers

The optical cable or cable element 1 depicted in FIG. 1 consists of twelve optical waveguide elements 2, which are stranded together, the direction of lay being always the same or changing after some turns (SZ stranding).

Each optical waveguide element contains twelve optical waveguides 3 which are disposed within a thin covering 4 of soft plastic. The thin, soft covering 4 renders possible removal of the covering 4 by the hands or fingers only, so that the optical waveguides 3 become accessible without additional tools.

An incompressible compound, which serves as a support for the thin covering 4 and also affords longitudinal watertightness, can also be contained within the covering 4, between the optical waveguides 3.

The stranded assemblage formed from the optical waveguide elements 2 is surrounded by a layer 5 which acts as a tensile-stress/compression protection. The layer 5 preferably consists of glass yarns. Over the glass yarn layer 5 is a further jacket 6, e.g. of polyethylene, which is applied in such a way that the layer 5 below it is compressed.

The free spaces between the optical waveguide elements 2 and the layer 5 are either filled with a filling compound or are occupied by several threads or yarns 7 of a material which swells upon the ingress of water.

Figure 2:
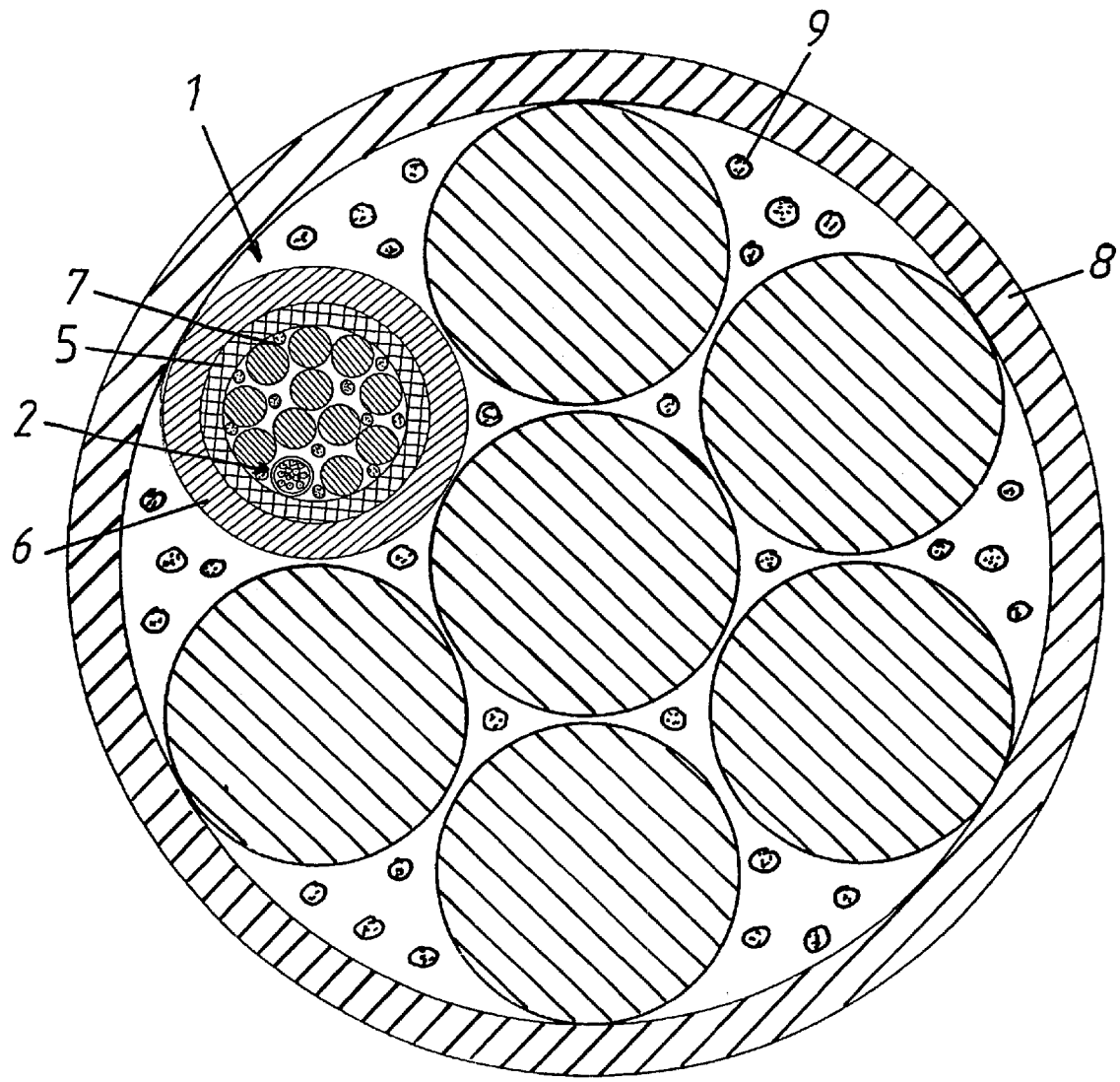
FIG. 2 shows a cable with 1008 fibers

FIG. 2 shows an optical cable which consists of seven cable elements 1 stranded together, as depicted in FIG. 1. The cable elements 1 are stranded together in either the same or a reversing direction of lay. The stranded assemblage constructed from the cable elements 1 is surrounded by an outer jacket 8, e.g. of polyethylene. Disposed in the free spaces between the cable elements 1 and the outer jacket 8 are threads or yarns 9 of a material which swells upon the ingress of water. Alternatively, the free spaces can also be filled with a filling compound, e.g. petroleum jelly. In the case of this cable construction, a layer of glass fibers, not depicted, can be disposed between the stranded assemblage and the outer jacket 8, being compressed by the outer jacket 8 in the same manner as the layer 5 in FIG. 1.

Figure 3:
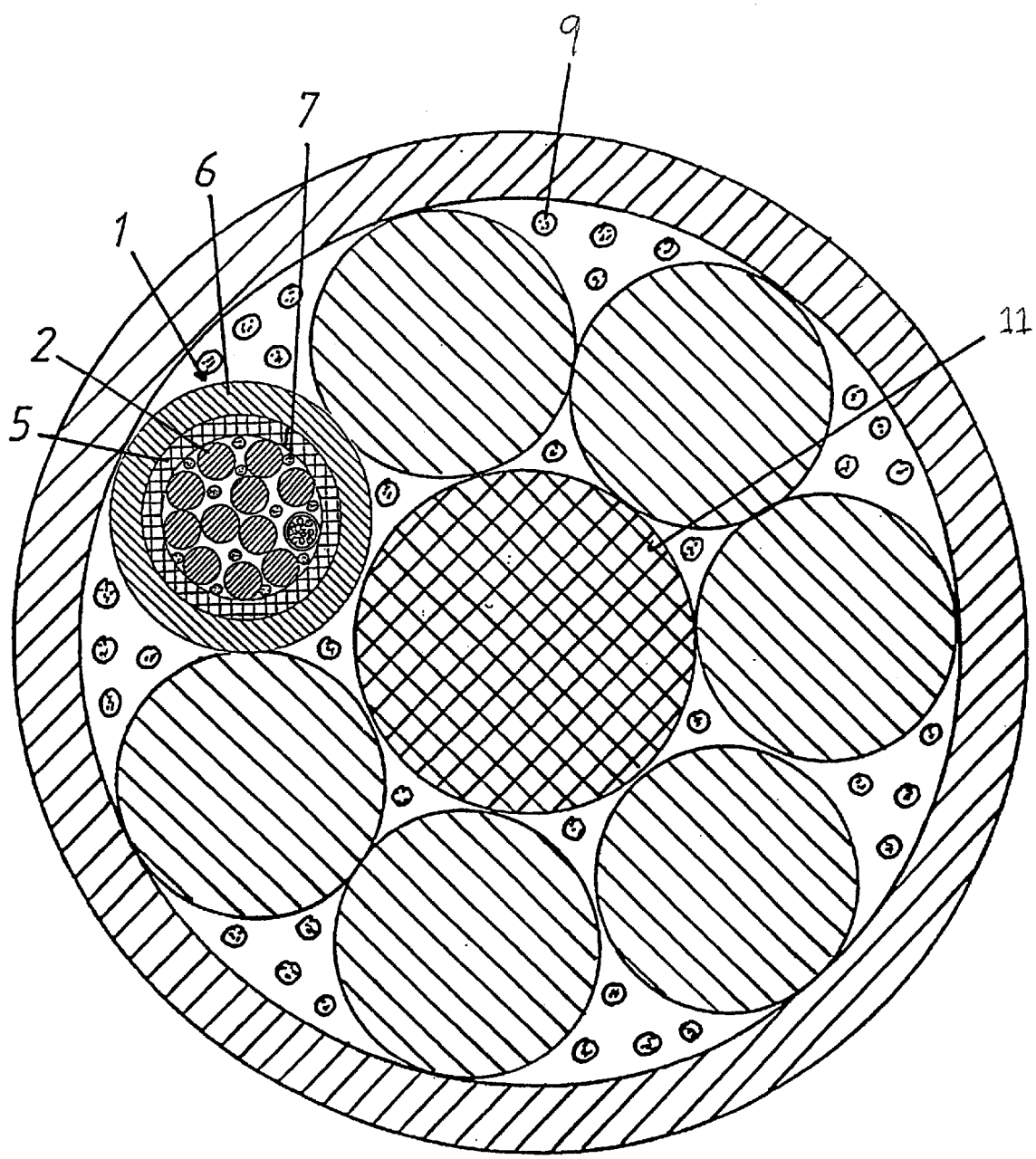
FIG. 3 also shows a cable with 1008 fibers

FIG. 3 depicts an optical cable which has a central tensile-stress/compression element 11, e.g. of glass-fibre reinforced plastic, around which seven cable elements 1—as depicted in FIG. 1—are stranded in the same or a reversing direction of lay. The stranded assemblage of the cable elements 1 is surrounded by an outer jacket 10, e.g. of polyethylene.

In this case, likewise, a plurality of threads or yarns 9 of a material which swells upon the ingress of moisture is disposed in the free spaces between the cable elements 1 and the outer jacket 10. Alternatively, the free spaces can be filled by a filling compound, e.g. a petroleum jelly based compound.

What is claimed is:

1. An optical cable or cable element comprising:
   a plurality of optical waveguide elements which are stranded together, the optical waveguide elements comprising several optical waveguides collected into a bundle, a plastic covering surrounding the bundle with a maximum free space of 0.1 mm, and an incompressible filling compound filling the intermediate spaces between the optical waveguides;
   a protection layer comprising longitudinally aligned glass or plastic fibers surrounding the optical waveguide elements; and
   an extruded outer jacket of a polymer compressing the layer radially.

2. The optical cable or cable element according to claim 1, further comprising threads or yarns of a material which swells upon the ingress of moisture disposed in intermediate spaces between the optical waveguide elements and the protection layer.

3. The optical cable or cable element according to claim 1, further comprising a moisture-blocking filling compound in intermediate spaces between the optical waveguide elements and the protection layer.

4. An optical cable comprising:
a plurality of the cable elements according to claim 1 stranded together; and
a common outer jacket.

5. The optical cable according to claim 4, further comprising threads or yarns of a material which swells upon the ingress of moisture disposed in intermediate spaces between the cable elements.

6. The optical cable according to claim 4, further comprising a moisture-blocking filling compound in intermediate spaces between the cable elements.

7. The optical cable according to claim 4, wherein the cable elements are stranded around a tensile-stress and compression-resistant core and are surrounded by a common outer jacket.

8. The optical cable according to claim 7, further comprising threads or yarns of a material which swells upon the ingress of moisture provided in intermediate spaces between the cable elements and the outer jacket.

9. The optical cable according to claim 7, further comprising a filling compound disposed in intermediate spaces between the cable elements and the outer jacket.

* * * * *